(12) United States Patent
Forghani et al.

(10) Patent No.: US 11,273,909 B2
(45) Date of Patent: Mar. 15, 2022

(54) BRAKE SYSTEM PROVIDING LIMITED ANTISKID CONTROL DURING A BACKUP MODE OF OPERATION

(71) Applicant: The Boeing Company, Chicago, IL (US)

(72) Inventors: Nima Forghani, Seattle, WA (US); David T. Yamamoto, Mill Creek, WA (US); Steven Elliot Smith, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 16/451,858

(22) Filed: Jun. 25, 2019

(65) Prior Publication Data
US 2020/0407049 A1 Dec. 31, 2020

(51) Int. Cl.
*B64C 25/42* (2006.01)
*B60T 8/17* (2006.01)
(Continued)

(52) U.S. Cl.
CPC .......... *B64C 25/426* (2013.01); *B60T 8/172* (2013.01); *B60T 8/1703* (2013.01); *B60T 8/176* (2013.01);
(Continued)

(58) Field of Classification Search
CPC ..... B64C 25/426; B64C 25/46; B60T 8/1703; B60T 8/172; B60T 8/176; B60T 2270/10;
(Continued)

(56) References Cited

U.S. PATENT DOCUMENTS

| 4,824,183 A | 4/1989 | Uchida et al. |
| 2003/0111895 A1 | 6/2003 | Salamat et al. |

(Continued)

FOREIGN PATENT DOCUMENTS

EP 1637422 A1 3/2006

OTHER PUBLICATIONS

Extended European Search Report, Application No. 20182345.7-1012, dated Oct. 22, 2020.
(Continued)

*Primary Examiner* — Faris S Almatrahi
*Assistant Examiner* — Andrew J Cromer
(74) *Attorney, Agent, or Firm* — Vivacqua Crane PLLC

(57) ABSTRACT

A brake system for a vehicle is disclosed and includes an energy storage device configured to store and discharge energy, a plurality of wheels, one or more processors operatively coupled to the energy storage device, and a memory coupled to the one or more processors. The memory stores data comprising a database and program code that, when executed by the one or more processors, causes the brake system to determine the brake system is operating in a backup mode of operation. In response to determining the brake system is operating in the backup mode of operation, the brake system calculates a dynamic slip of the plurality of wheels. The brake system is caused to determine a slip error by comparing the dynamic slip with a target slip value of the plurality of wheels. The brake system is also caused to calculate an antiskid command based on the slip error.

20 Claims, 8 Drawing Sheets

(51) Int. Cl.
*B60T 8/172* (2006.01)
*B60T 8/176* (2006.01)

(52) U.S. Cl.
CPC ..... *B60T 2270/10* (2013.01); *B60T 2270/402* (2013.01)

(58) Field of Classification Search
CPC ........... B60T 2270/402; B60T 2240/00; B60T 8/17633; B60T 13/741; B60T 8/885; F15B 1/022
See application file for complete search history.

(56) References Cited

U.S. PATENT DOCUMENTS

| | | | |
|---|---|---|---|
| 2003/0120413 A1* | 6/2003 | Park | B60T 8/1703 701/71 |
| 2005/0040286 A1 | 2/2005 | Radford | |
| 2005/0261818 A1* | 11/2005 | Brown | B60T 8/1766 701/70 |
| 2006/0061210 A1* | 3/2006 | Ralea | B60T 8/885 303/20 |
| 2006/0097567 A1* | 5/2006 | Butler, III | B60T 8/321 303/20 |
| 2007/0069071 A1* | 3/2007 | Near | B64D 39/00 244/99.2 |
| 2009/0012689 A1* | 1/2009 | Spetler | G06F 30/20 701/82 |
| 2009/0210128 A1 | 8/2009 | Fujimoto et al. | |
| 2016/0009385 A1* | 1/2016 | Van Deventer | B60T 8/173 701/71 |

OTHER PUBLICATIONS

Final Office Action, U.S. Appl. No. 16/451,868, dated May 5, 2021.
U.S. Patent and Trademark Office. Non-Final Office Action for U.S. Appl. No. 16/451,868, dated Jan. 6, 2022, pp. 1-33.

* cited by examiner

BRAKE SYSTEM PROVIDING LIMITED ANTISKID CONTROL DURING A BACKUP MODE OF OPERATION

INTRODUCTION

The present disclosure relates to a brake system for a vehicle. More particularly, the present disclosure is directed towards a brake system that employs a limited antiskid control strategy during a backup mode of operation to conserve energy stored within an energy storage device.

BACKGROUND

Aircraft brakes are used in a variety of situations. For example, aircraft brakes are used to slow the aircraft down during landing roll along a runway. Aircraft brakes may also be used during ground handling operations such as, for example, taxiing, steering, and parking.

Hydraulic aircraft brake systems include an accumulator that stores hydraulic braking fluid under pressure. The accumulator is used as a redundant pressure source as well as a backup source of fluid energy. Specifically, the braking accumulator is primarily used to provide sustained hydraulic pressure after the active hydraulic system is depressurized, and is also used as a backup source of energy in the event there is a loss of hydraulic pressure within the brake system or if the aircraft's hydraulic power system becomes inoperable. However, the accumulator is only able to store a limited amount of hydraulic brake fluid. Accordingly, the hydraulic fluid level and pressure of the accumulator is depleted each time brake pressure is applied and released. For example, some accumulators are sized to provide enough hydraulic fluid for only about six to eight brake applications. Furthermore, with each brake application, the accumulator pressure, accumulator fluid volume, and maximum braking pressure decrease. Once the accumulator is emptied, then the brakes may no longer be applied to reduce the speed of the aircraft.

In an effort to preserve the hydraulic fluid stored within the accumulator, some functions of the brake system may not be available when the accumulator is being used as a backup source of fluid energy. For example, sometimes the brake system may only use pedal brake control (i.e., brake input by a pilot), without antiskid control. Antiskid control provides skid protection by momentarily relieving the hydraulic pressure provided to a wheel, which results in the wheel being able to rotate and avoid a skid. Omitting antiskid control may create issues if the aircraft is traveling along a slippery surface, such as an icy runway. Alternatively, in another approach, the brake system may still provide antiskid control when the accumulator is used as a backup source of fluid energy. However, this may result in the accumulator being emptied relatively quickly if the brakes are released excessively because of skid protection.

SUMMARY

According to several aspects, a brake system for a vehicle is disclosed. The brake system includes an energy storage device configured to store and discharge energy, a plurality of wheels, one or more processors operatively coupled to the energy storage device and in electrical communication with the plurality of wheels, and a memory coupled to the one or more processors. The memory stories data comprising a database and program code that, when executed by the one or more processors, causes the brake system to determine the brake system is operating in a backup mode of operation. In response to determining the brake system is operating in the backup mode of operation, the brake system is caused to calculate a dynamic slip of the plurality of wheels. The brake system is also caused to determine a slip error by comparing the dynamic slip with a target slip value of the plurality of wheels, where the target slip value is offset from an ideal slip value of the plurality of wheels and results in a reduced braking efficiency of the brake system. The brake system is also caused to calculate an antiskid command based on the slip error, where the antiskid command reduces an amount of brake pressure applied to the plurality of wheels.

According to another aspect, an aircraft is disclosed. The aircraft includes a brake system including a plurality of wheels and an accumulator, where the accumulator is configured to store and discharge fluid energy as a pressurized hydraulic brake fluid. The aircraft also includes one or more processors operatively coupled to the accumulator and in electrical communication with the plurality of wheels and a memory coupled to the one or more processors. The memory stores data comprising a database and program code that, when executed by the one or more processors, causes the brake system to determine the brake system is operating in a backup mode of operation, where the backup mode of operation conserves the fluid energy stored in the accumulator. In response to determining the brake system is operating in the backup mode of operation, the brake system is caused to calculate a dynamic slip of the plurality of wheels. The brake system is further caused to determine a slip error by comparing the dynamic slip with a target slip value of the plurality of wheels, where the target slip value is offset from an ideal slip value of the plurality of wheels and results in a reduced braking efficiency of the brake system. The brake system is also caused to calculate an antiskid command based on the slip error, where the antiskid command reduces an amount of brake pressure applied to the plurality of wheels.

In still another aspect, a method of determining an antiskid command during a backup mode of operation for a brake system of a vehicle is disclosed. The brake system includes a plurality of wheels and energy storage device configured to store and discharge energy. The method includes determining, by a computer, the brake system is operating in a backup mode of operation. In response to determining the brake system is operating in the backup mode of operation, the method includes calculating, by the computer, a dynamic slip of the plurality of wheels. The method also includes determining a slip error by comparing the dynamic slip with a target slip value, where the target slip value is less than an ideal slip value and results in a reduction in braking efficiency when compared to the ideal slip value. Finally, the method includes calculating an antiskid command based on the slip error, where the antiskid command reduces an amount of brake pressure applied to the plurality of wheels.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The disclosure is directed towards a brake system for a vehicle, where the brake system includes an energy storage device. During a backup mode of operation, the energy storage device is used to supply energy to the brake system. The brake system conserves an amount of energy that is stored within the energy storage device during the backup mode of operation. Specifically, a control module of the brake system determines an antiskid command that represents a reduction in brake pressure applied to the wheels of the vehicle. The antiskid command is calculated based on an error between a dynamic slip of the wheels and a target slip value of the wheels. The target slip value is offset from an ideal slip value of the wheels, and results in a reduced stopping efficiency of the brake system. However, since the target slip results in a reduced amount of brake pressure applied to the wheels, the brake system consumes less energy from the energy storage device each time brakes are applied to reduce the speed of the vehicle.

The following description is merely exemplary in nature and is not intended to limit the present disclosure, application, or uses.

Figure 1:
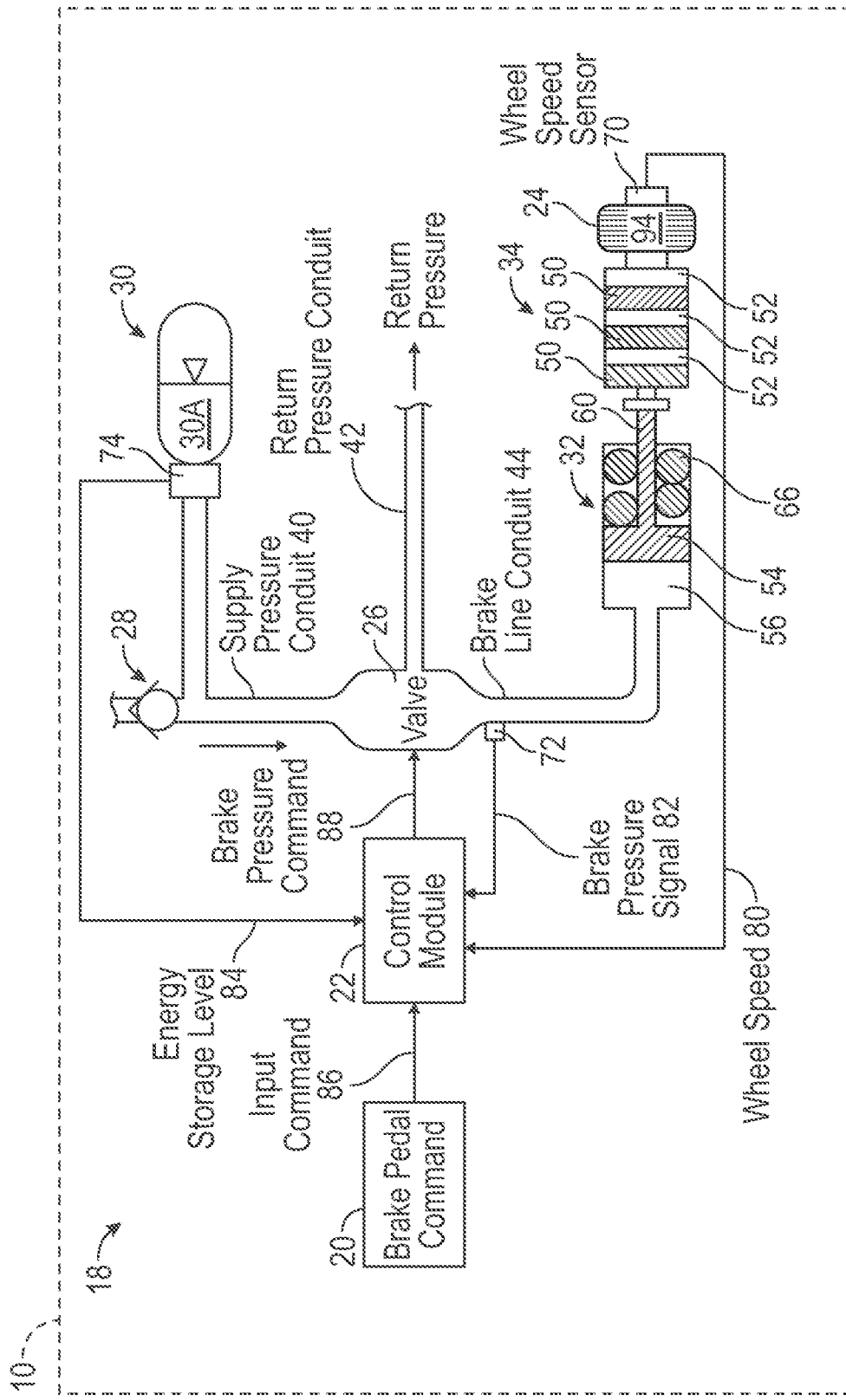
FIG. 1 is a schematic diagram of a brake system including an energy storage device in the form of an accumulator, according to an exemplary embodiment.

Referring to FIG. 1, a schematic diagram of a vehicle 10 having a brake system 18 is illustrated. The brake system 18 includes a brake pedal command 20, a control module 22, a plurality of wheels 24 (only one wheel 24 is shown in FIG. 1), a valve 26, a one-way or check valve 28, an energy storage device 30, a piston cylinder assembly 32, and a brake stack 34. The control module 22 is in electronic communication with the brake pedal command 20 and the valve 26. The valve 26 fluidly connects the piston cylinder assembly 32 with the energy storage device 30 when the brake system 18 is operating in a backup mode of operation, which is explained in greater detail below. The energy storage device 30 is any type of device configured to store and discharge energy when required by the brake system 18. For example, in the embodiment as shown, the energy storage device 30 is an accumulator 30A configured to store and discharge energy as a pressurized hydraulic brake fluid. The energy storage device 30 provides a source of backup energy when the brake system 18 loses active hydraulic power. As explained below, when the energy storage device 30 is used as a source of backup energy, the brake system 18 limits the antiskid control employed by the brake system 18 to conserve the energy stored in the energy storage device 30.

In the non-limiting embodiment as shown in FIG. 1, the brake system 18 employs a hydraulic brake fluid and the energy storage device 30 is the accumulator 30A. The accumulator 30A configured to store and discharge fluid energy as a pressurized hydraulic brake fluid. Some examples of the accumulator 30A include, but are not limited to, a compressed gas accumulator (also referred to as a bladder-type accumulator) or a spring accumulator. Although FIG. 1 illustrates a brake system 18 employing hydraulic brake fluid, it is to be appreciated that the brake system 18 is not limited to hydraulic systems. For example, in another embodiment, the brake system 18 is an electronic brake system. Furthermore, the energy storage device 30 is not limited to an accumulator 30A. Instead, the energy storage device 30 includes any type of device configured to store and release energy such as, but not limited to, a battery, a capacitor, or a flywheel.

In one embodiment, the vehicle 10 is an aircraft 182 (seen in FIG. 5) including a hydraulic brake system 18 and the accumulator 30A. However, it is to be appreciated that the brake system 18 may also be employed in other types of vehicles that operate under a limited power source (i.e., the energy storage device 30) as well. It is also to be appreciated that while FIG. 1 illustrates only a single brake system 18, an aircraft may actually include multiple brake systems 18. For example, an aircraft may include separate brake systems that correspond to the left and right wheels of an aircraft.

The brake system 18 also includes a supply pressure conduit 40, a return pressure conduit 42 and a brake line conduit 44. The supply pressure conduit 40 is fluidly connected to the check valve 28 and the energy storage device 30, and the brake line conduit 44 is fluidly connected to the piston cylinder assembly 32. The valve 26 is configured to fluidly connect the brake line conduit 44 with either the supply pressure conduit 40 or the return pressure conduit 42. When the valve 26 fluidly connects the supply pressure conduit 40 with the brake line conduit 44, pressurized brake fluid is supplied to piston cylinder assembly 32. The check valve 28 prevents brake fluid from flowing in a direction opposite the valve 26.

The brake stack 34 includes one or more rotors 50 and one or more stators 52, where the rotors 50 rotate in concert with the wheels 24. The piston cylinder assembly 32 includes a piston 54, a cylinder 56, and a biasing element 66, where the piston 54 is configured to translate back and forth in a linear motion within the cylinder 56. In the embodiment as shown, the biasing element 66 is a coil spring. When the valve 26 fluidly connects the supply pressure conduit 40 with the brake line conduit 44, pressurized brake fluid is supplied to piston cylinder assembly 32 and causes the piston 54 to overcome a biasing force exerted by the biasing element 66. Once the piston 54 overcomes the biasing force, the piston 54 translates within the cylinder 56 in a direction towards the brake stack 34. The piston 54 continues to travel towards the brake stack 34 until an end portion 60 of the piston 54 abuts against and exerts a compressive force upon the brake stack 34. When the brake stack 34 is compressed, friction forces are developed between the rotors 50 and stators 52 that resist rotation of the wheels 24.

The brake system 18 further includes a wheel speed sensor 70, a brake pressure transducer 72, and an accumulator pressure transducer 74 that are each in electrical communication with the control module 22. The wheel speed sensor 70 measures a rotational speed of the wheels 24, which is referred to as the wheel speed 80. The brake pressure transducer 72 measures the fluid pressure within the brake line conduit 44 and generates a proportional electrical signal that is referred to as a brake pressure signal 82. The accumulator pressure transducer 74 measures the fluid pressure of the energy storage device 30 (i.e., the accumulator 30A), and generates an accumulator pressure signal that is referred to as an energy storage level 84. This is because a decrease in the accumulator pressure indicates a decrease in the amount of energy stored within the accumulator 30A.

The control module 22 receives as input the wheel speed 80, the brake pressure signal 82, and the energy storage level 84. The control module 22 also receives an input command 86 from the brake pedal command 20. The input command 86 represents an amount of braking requested by the brake system 18. For example, if the brake pedal command 20 is a brake pedal, then an operator depresses the brake pedal manually to create the input command 86 received by the control module 22. The control module 22 determines a brake pressure command 88 that is sent to the valve 26. The brake pressure command 88 instructs the valve 26 to either increase or decrease the fluid pressure supplied to the brake system 18. Specifically, the valve 26 fluidly connects the supply pressure conduit 40 and the energy storage device 30 to the brake line conduit 44 to increase the fluid pressure supplied to the brake system. The valve 26 fluidly connects the return pressure conduit 42 to the brake line conduit 44 to decrease the fluid pressure supposed to the brake system 18. For example, in one non-limiting embodiment, the valve 26 is a servo valve and the brake pressure command 88 is a milliamp signal.

The backup mode of operation of the brake system 18 is now described. Specifically, when the brake system 18 experiences a loss of active power, then the control module 22 executes the backup mode of operation. Specifically, the control module 22 is operatively connected to the energy storage device 30. During the backup mode of operation, the control module 22 instructs the valve 26 to fluidly connect the energy storage device 30 to the brake line conduit 44. For example, if the brake system 18 employs a hydraulic brake fluid, then the accumulator 30A is used as a backup source of fluid energy in the event there is a loss of active supply hydraulic pressure within the brake system 18.

It is to be appreciated the energy storage device 30 only contains a fixed or limited amount of energy such as, for example, hydraulic brake fluid. Similarly, if the brake system 18 is an electrical brake system, then a battery may only contain a limited amount of chemical energy that is readily converted into electrical power. The disclosed backup mode of operation conserves the amount of energy stored in the energy storage device 30 by instructing the brake system 18 to execute a limited antiskid control strategy. Specifically, the backup mode of operation limits the dynamic change of fluid pressure supplied to the brake system 18, which in turn conserves the amount of energy (i.e., hydraulic brake fluid, chemical energy, etc.) stored in the energy storage device 30.

Figure 2:
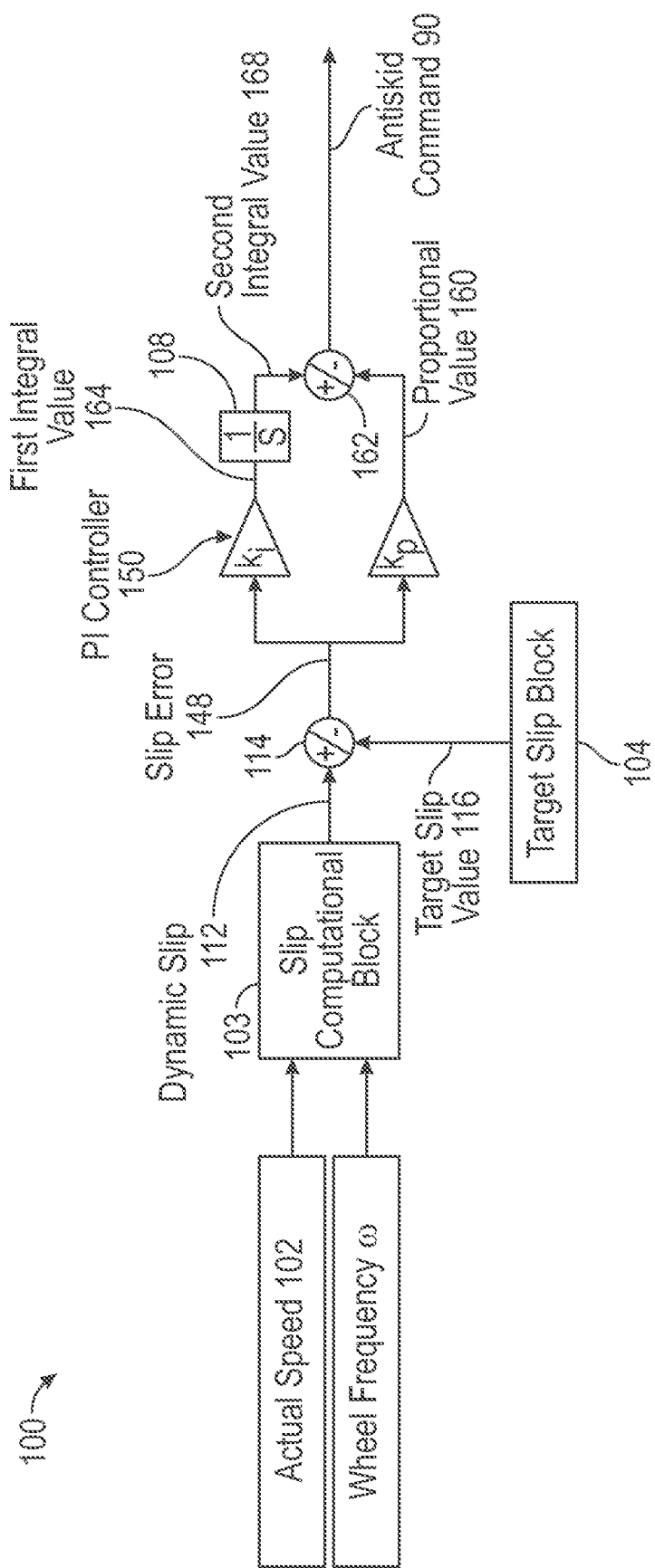
FIG. 2 is a block diagram illustrating an approach for determining an antiskid command when the brake system is operating in a backup mode of operation, according to an exemplary embodiment.

FIG. 2 is a block diagram 100 illustrating one approach to calculate an antiskid command 90 by the control module 22. The antiskid command 90 is derived from the wheel speed 80. The antiskid command 90 reduces an amount of brake pressure applied to the plurality of wheels 24 and provides antiskid control as the vehicle 10 comes to a stop. However, it is to be appreciated that the antiskid command 90 provides a reduced amount of antiskid control when compared to a conventional antiskid system. Turning back to FIG. 2, the block diagram 100 includes a slip computational block 103, a target slip block 104, an integrator gain a proportional gain $k_p$, and an integrator 108.

Referring to FIGS. 1 and 2, the control module 22 dynamically calculates the brake pressure command 88 once the wheels 24 of the vehicle 10 rotate along a surface. For example, if the vehicle 10 is an aircraft, then the control module 22 dynamically calculates the brake pressure command 88 once the wheels 24 rotate along a runway surface. The control module 22 receives as input or determines a wheel frequency $\omega$ based on the wheel speed 80 as the wheels 24 rotate along a ground surface. The control module 22 also receives as input an actual speed 102. For example, if the vehicle 10 is an aircraft, then the actual speed 102 is a ground speed signal.

Continuing to refer to FIGS. A and 2, the slip computational block 103 calculates a dynamic slip 112 of the plurality of wheels 24 based on the wheel frequency co and the actual speed 102. Specifically, in an embodiment, the slip computational block 103 calculates the dynamic slip 112 based on Equation 1, which is:

$$\text{Dynamic slip } 112 = \frac{(\text{actual speed signal } 102 - R * \omega)}{\text{actual speed signal } 102}$$

where R represents a tire rolling radius of the tires 94 of the plurality of wheels 24 of the vehicle 10. The dynamic slip 112 is then sent to a summing junction 114. The summing junction 114 receives as input the dynamic slip 112 and a target slip value 116 of the plurality of wheels 24. The target slip value 116 may also be referred to as a slip offset as well, since the target slip value 116 is offset from an ideal slip value of the plurality of wheels 24. The target slip value 116 results in a reduction in braking efficiency of the brake system 18 when compared to the ideal slip value, which is explained below and shown in FIG. 3. It is to be appreciated that the target slip value 116 is a fixed value, where the fixed value is based on a type of tire 94 installed on the plurality of wheels 24. The type of tire 94 depends on characteristics such as, for example, belt construction and sidewall construction, where belt construction refers to either a radial or cross-ply construction. Accordingly, if the specific type of tires 94 installed on the wheels 24 change, then the target slip value 116 is updated.

Figure 3:
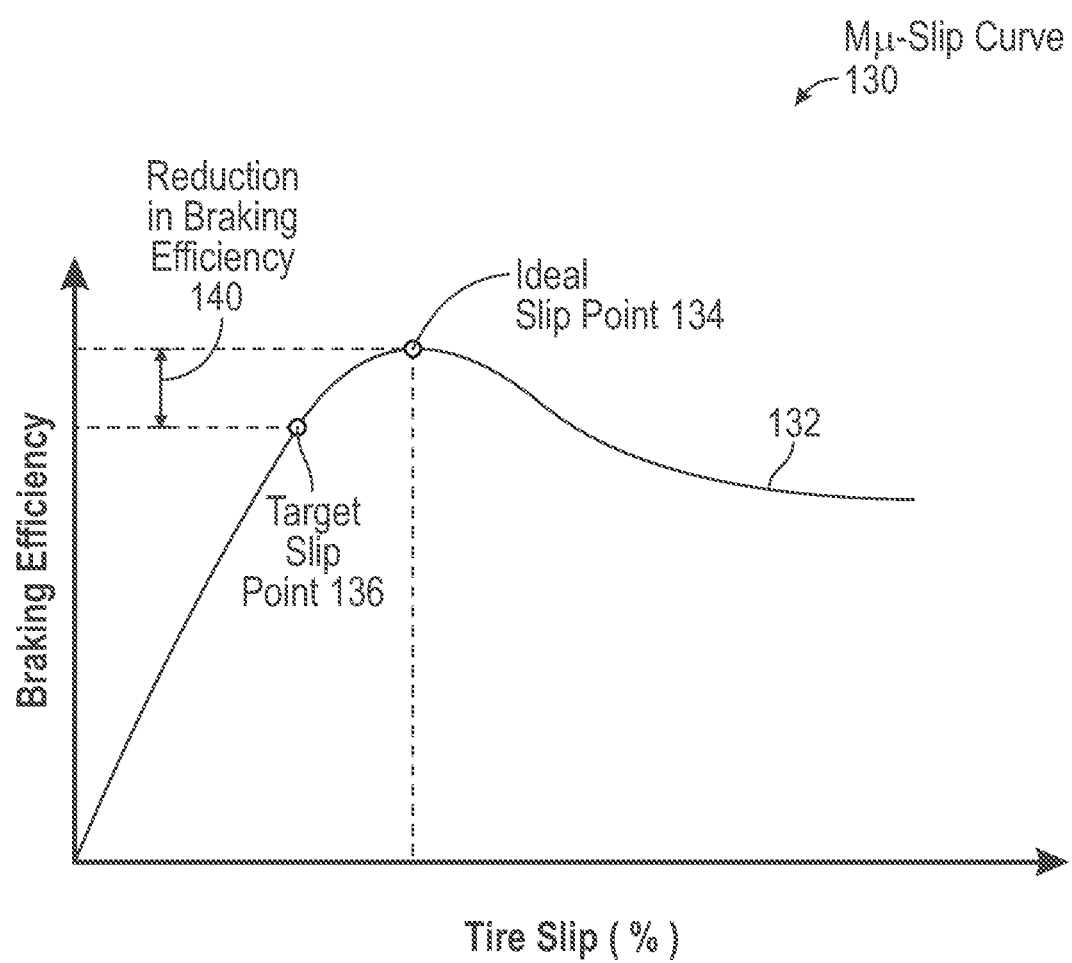
FIG. 3 is an exemplary mu-slip curve illustrating an ideal slip point and a target slip point, according to an exemplary embodiment.

FIG. 3 illustrates an exemplary mu-slip curve 130. It is to be appreciated that the mu-slip curve 130 is shown for purposes of explanation, and the control module 22 may not have knowledge of the mu-slip curve 130. The specific mu-slip curve profile 132 is based on the specific type of tires 94 (FIG. 1). The mu-slip curve 130 includes an x-axis that represents tire slip and a y-axis that represents braking efficiency. In the non-limiting example as shown in FIG. 3, an ideal slip point 134 represents the point along the mu-slip curve 130 that results in a maximum percentage of braking efficiency. In an embodiment, the ideal slip point 134 results in about 12% braking efficiency. A target slip point 136 is offset from the ideal slip point 134. For example, in the embodiment as shown, the target slip point 136 correlates to about 8-10% braking efficiency. The difference between the ideal slip point 134 and the target slip point 136 is referred to as a reduction in braking efficiency 140.

Referring to FIGS. 1 and 3, it is to be appreciated that the reduction in braking efficiency 140 results in a reduced stopping efficiency of the brake system 18. In other words, the target slip point 136 results in reduced performance parameters as the brake system 18 brings the vehicle 10 to a stop. Some examples of brake performance parameters include, but are not limited to, stopping distance and time. If a vehicle 10 takes too long or requires too much distance when coming to a stop, this may create adverse conditions. Accordingly, the control module 22 selects the target slip point 136 that results in the brake system 18 having the vehicle 10 come to a stop within a threshold time and a threshold distance. For example, if the vehicle 10 is an aircraft, then the threshold time and the threshold distance ensure that the aircraft remains on the runway during landing. Accordingly, the target slip value 116 seen in FIG. 2 represents an increase in stopping distance and stopping time of the brake system 18 when compared to the ideal slip value. However, the target slip value 116 also results in the brake system 18 consuming less energy from the energy storage device 30 each time the brake system 18 is applied.

Referring to FIGS. 1 and 2, the summing junction 114 determines a slip error 148 by comparing the dynamic slip 112 with the target slip value 116, where the slip error 148 is the difference between the dynamic slip 112 and the target slip. The slip error 148 is then applied to a proportional-integral (PI) controller 150 to determine the antiskid command 90. The PI controller 150 includes the proportional gain $k_p$, the integral gain $k_i$, and the integrator 108.

Combining the proportional gain $k_p$ with the slip error 148 results in a proportional increase in a value of the antiskid command 90 as the slip error 148 remains constant. Higher values of the proportional gain $k_p$ result in removing the slip error 148 from the antiskid command 90 at a faster rate. The proportional gain $k_p$ is based on brake system dynamics (i.e., valves, tires, and hydraulics) and structural dynamics of the vehicle 10. If the vehicle 10 is an aircraft, then the proportional gain $k_p$ is also based on aerodynamics and a ground reaction. The ground reaction refers to friction and vertical force applied upon the aircraft. The control module 22 combines the slip error 148 with the proportional gain $k_p$, which results in a proportional value 160 that is sent to a summing junction 162.

The integral gain $k_i$ is a fixed value stored in a memory 1034 (FIG. 8) of the control module 22. Alternatively, the proportional gain $k_p$ is a function or is determined based on a look-up table. The integral gain $k_i$ results in a reduced steady-state rate of slip error 148 for a given response of the brake system 18. A higher value of the integral gain $k_i$ results in removing the slip error 148 from the antiskid command 90 at a faster rate. It is to be appreciated that increasing the integral gain $k_i$ allows for the brake system 18 to adjust to skidding quickly, without the need to command the proportional gain $k_p$ constantly. The control module 22 combines the slip error 148 with the integral gain $k_i$, which results in a first integral value 164. The first integral value 164 is integrated by the integrator 108, and the resulting second integral value 168 is sent to the summing junction 162.

The summing junction 162 combines the proportional value 160 and the second integral value 168 together, which results in the antiskid command 90. As seen in FIG. 3, the brake pressure command 88 is determined based on the input command 86 and the antiskid command 90. Specifically, the control module 22 determines the brake pressure command 88 based on a difference between the antiskid command 90 and the input command 86, where the brake pressure command 88 indicates an amount of compressive force exerted upon the plurality of wheels 24 of the vehicle 10 by the brake stack 34.

Figure 4:
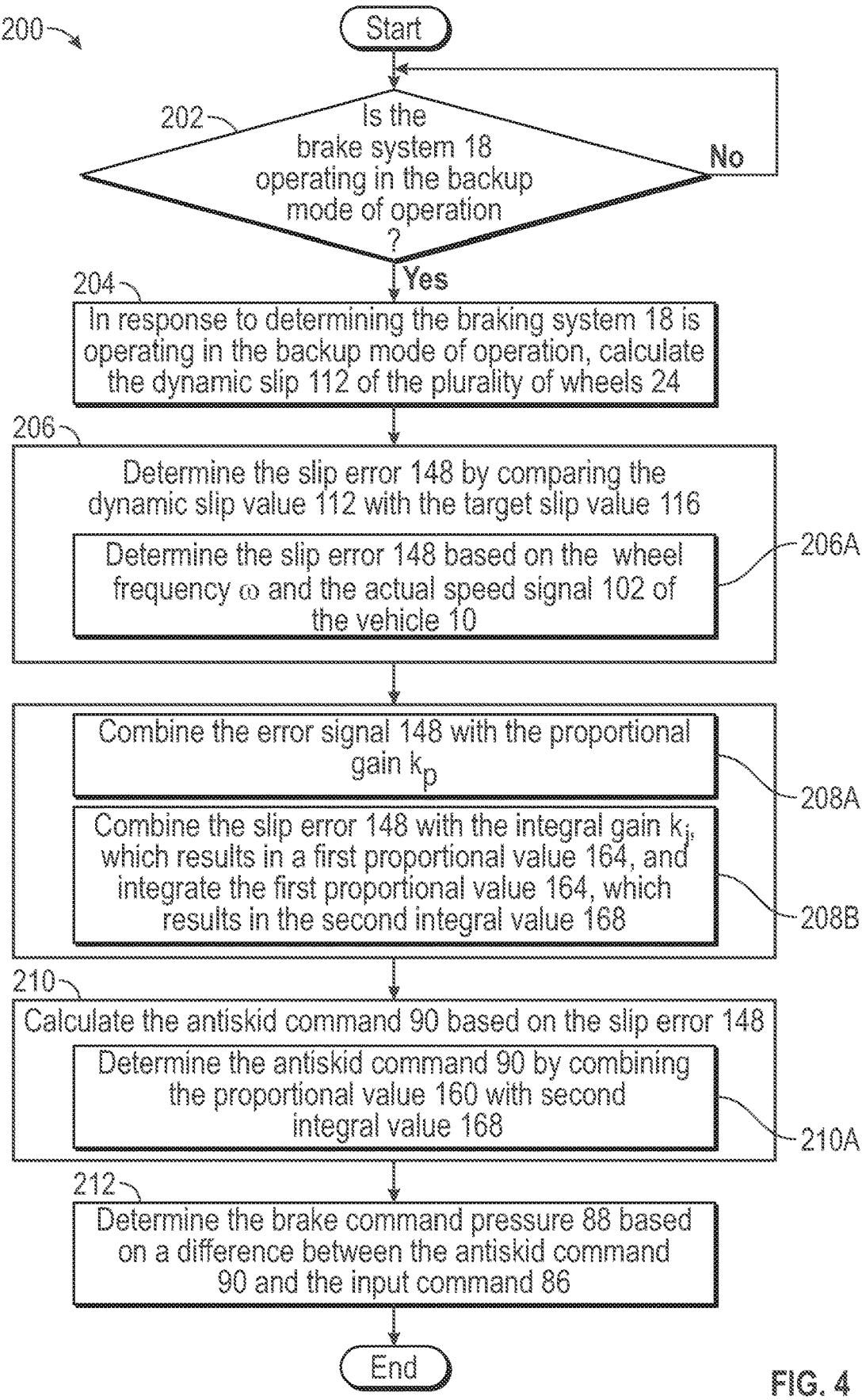
FIG. 4 is a process flow diagram illustrating a method for determining the antiskid command based on the system shown in FIG. 2, according to an exemplary embodiment.

Referring now to FIG. 4, an exemplary process flow diagram illustrating a method 200 of determining the antiskid command 90 during the backup mode of operation is shown. Referring to FIGS. 1, 2, and 4, the method 200 begins at decision block 202. In decision block 202, the control module 22 determines if the brake system 18 is operating in the backup mode of operation. As mentioned above, the backup mode of operation conserves energy stored in the energy storage device. If the brake system 18 is operating in the backup mode of operation, then the method 200 may then proceed to block 204.

In block 204, in response to determining the brake system 18 is operating in the backup mode of operation, the control module 22 calculates the dynamic slip 112 (seen in FIG. 2) of the plurality of wheels 24. The method 200 may then proceed to block 206.

In block 206, the control module 22 determines the slip error 148 by comparing the dynamic slip 112 with the target slip value 116, where the target slip value 116 is less than the ideal slip value of the plurality of wheels 24 and results in a reduction in braking efficiency when compared to the ideal slip value.

In an embodiment, the control module 22 determines the slip error 148 in block 206A. Specifically, in block 206A, the control module 22 determines the slip error 148 based on the wheel frequency ω of the plurality of wheels 24 and the actual speed 102 of the vehicle 10. In an embodiment, the control module determines the slip error 148 based on Equation 1, which is shown above. The method 200 may then proceed to block 208.

Referring specifically to FIGS. 2 and 4, in block 208A the control module 22 combines the slip error 148 with the proportional gain $k_p$, which results in the proportional value 160. As mentioned above, combining the proportional gain $k_p$ with the slip error 148 results in a proportional increase in the value of the antiskid command 90 as the slip error 148 remains constant.

In block 208B, the control module 22 combines the slip error 148 with the integral gain which results in a first integral value 164. The control module 22 also integrates the first integral value 164, which results in the second integral value 168. The method 200 may then proceed to block 210.

In block 210, the control module 22 calculates the antiskid command 90 based on the slip error 148, where the antiskid command 90 reduces an amount of brake pressure applied to the plurality of wheels 24. As seen in block 210A, the control module 22 determines the antiskid command 90 by combining the proportional value 160 with the second integral value 168. The method 200 may then proceed to block 212.

In block 212, the control module 22 determines the brake pressure command 88 based on a difference between the antiskid command 90 and the input command 86, where the input command 86 represents an amount of braking requested by the brake system 18. The method 200 may then return to block 204, or, alternatively the method 200 may terminate.

Figure 5:
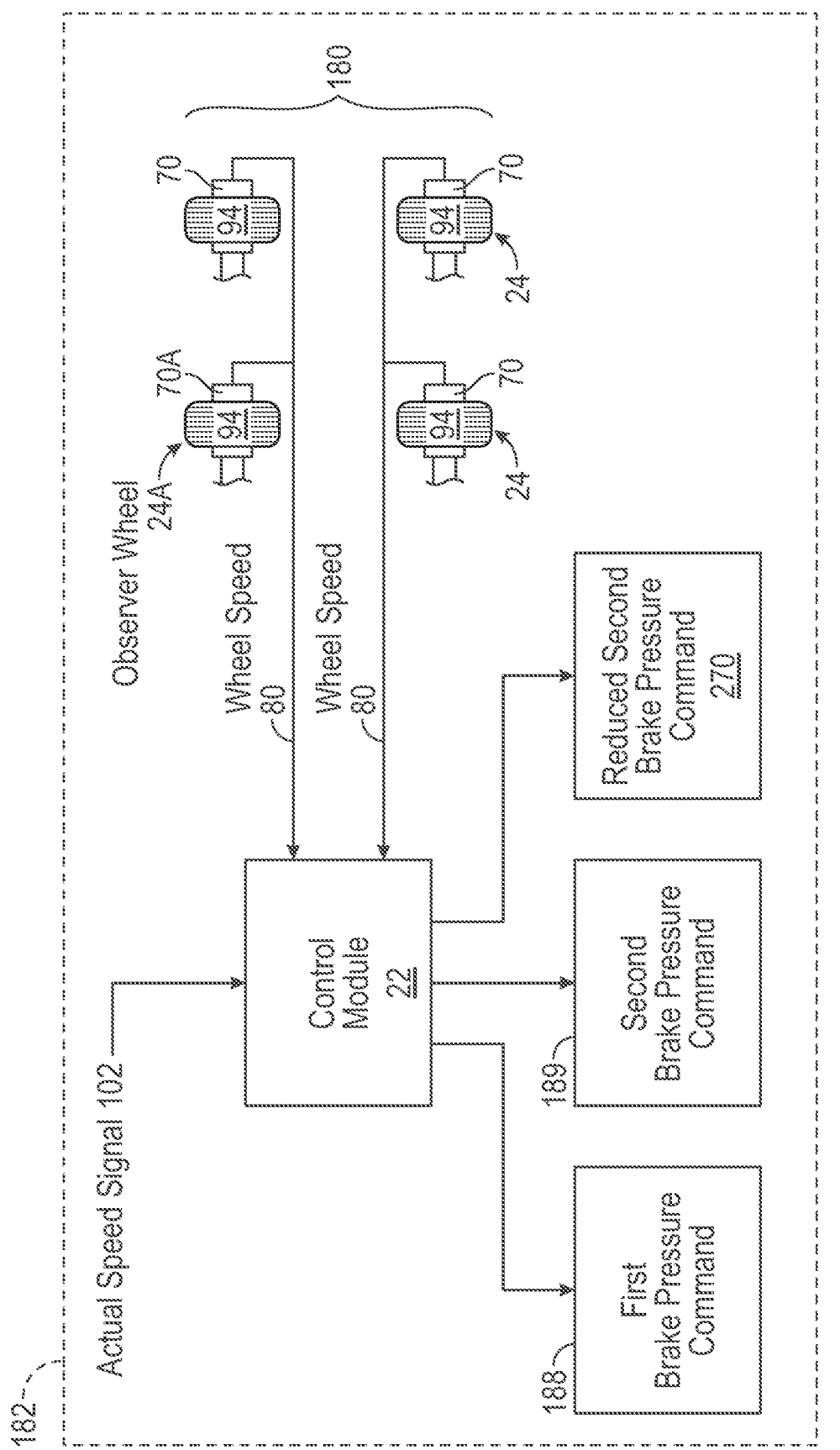
FIG. 5 is a block diagram illustrating an alternative approach for determining an antiskid command when the brake system is operating in the backup mode, according to an exemplary embodiment.

Turning now to FIG. 5, another approach to determine the brake pressure command 88 is now described. In the exemplary embodiment as shown in FIG. 5, the plurality of wheels 24 are part of a set of wheels 180. For example, in an embodiment, the set of wheels 24 are a set of landing gear for an aircraft 182. It is to be appreciated that some larger aircraft may include multiple sets of landing gear. For example, some larger aircraft may include five sets of landing gears. In the non-limiting embodiment as shown, the landing gear set includes four wheels 24. Each wheel 24 is monitored by a corresponding wheel speed sensor 70.

Continuing to refer to FIG. 5, a single wheel 24 that is part of the set of wheels 24 is designated as an observer wheel 24A. The observer wheel 24A is monitored to determine the mu-slip coefficient μ. Although the top left wheel 24 is designated as the observer wheel 24A, it is to be appreciated that this illustration is merely exemplary in nature, and any of the wheels 24 may be designated as the observer wheel 24A. It is to be appreciated that each set of wheels 180 includes a corresponding designated observer wheel 24A. For example, an aircraft having five sets of landing gear would include five designated observer wheels 24A.

In response to determining the wheels 24 are rotating along a surface, the control module 22 determines a first brake pressure command 188 that is only applied to the designed observer wheel 24A. It is to be appreciated that the first brake pressure command 188 is determined based on the ideal slip value. Specifically, referring to FIG. 3, the first brake pressure command 188 is determined based on the ideal slip point 134 along the mu-slip curve 130, and not the target slip point 136. Accordingly, the first brake pressure command 188 does not result in a reduced braking efficiency 140 (seen in FIG. 3).

The control module 22 receives as input the wheel speed 80 from the wheel speed sensor 70A of the observer wheel 24A. The control module 22 also receives the actual speed 102, such as a ground speed signal of the aircraft 182. The control module 22 determines a difference between the wheel speed 80 of the observer wheel 24A and the actual speed 102. As explained in greater detail below, the control module 22 determines when the observer wheel 24A starts to undergo a skid condition 190 (shown in FIG. 6C) based on the difference between the wheel speed 80 of the observer wheel 24A and the actual speed 102. In response to detecting a start of the skid condition 190, the control module 22 decreases the first brake pressure command 188, which results in the observer wheel 24A recovering from the skid condition 190. Once the observer wheel 24A has undergone at least one skid condition, then the control module 22 calculates a second brake pressure command 189 that is applied to the remaining wheels 24 that are part of the set of wheels 180.

Figure 6A:
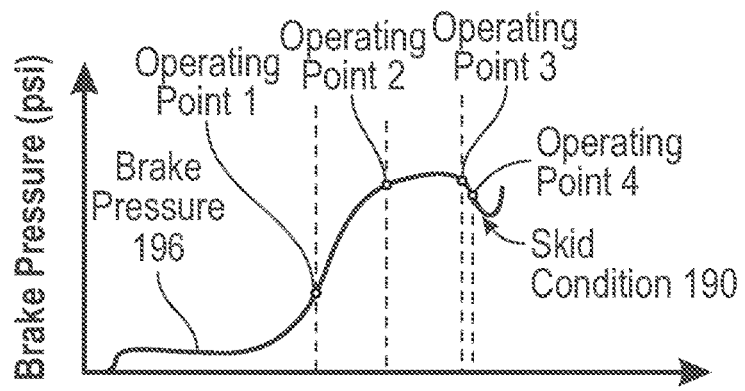
FIG. 6A is a graph illustrating the brake pressure of an observer wheel shown in FIG. 5 undergoing a skid condition, according to an exemplary embodiment.
Figure 6B:
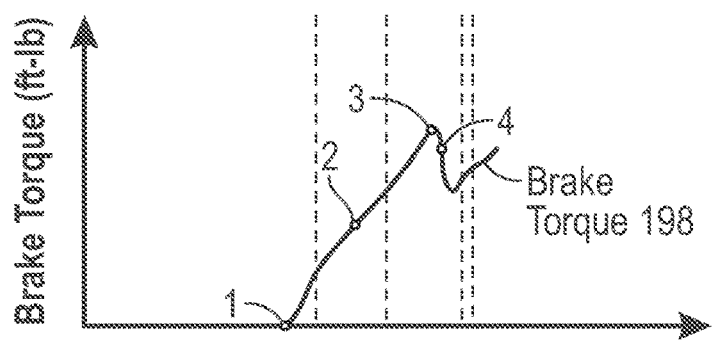
FIG. 6B is a graph illustrating brake torque of the observer wheel, according to an exemplary embodiment.
Figure 6C:
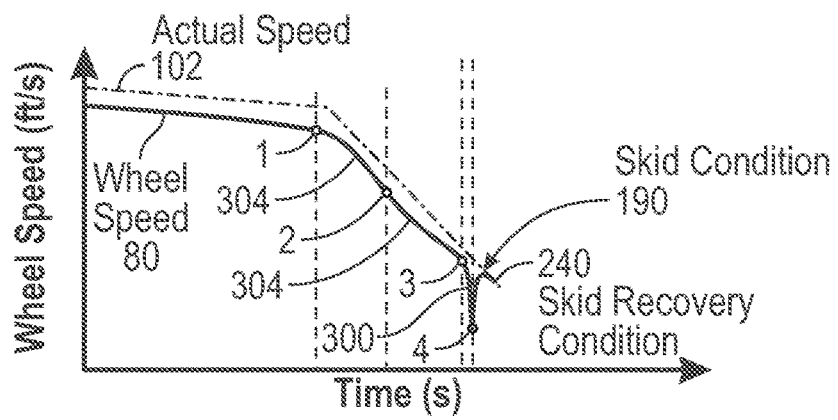
FIG. 6C is a graph illustrating the wheel speed of the observer wheel compared to the actual vehicle speed, according to an exemplary embodiment.
Figure 6D:
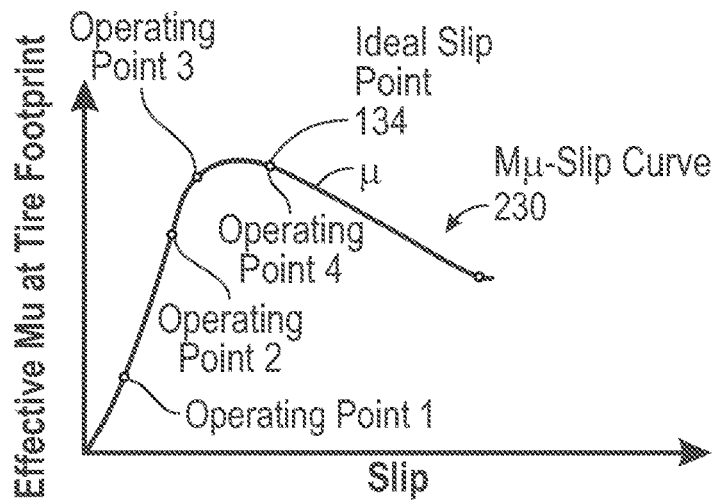
FIG. 6D is a mu-slip curve of the observer wheel undergoing the skid, according to an exemplary embodiment.

FIG. 6A illustrates a graph of a brake pressure 196 of the observer wheel 24A (i.e., the brake pressure signal 82 seen in FIG. 1) during the skid condition 190. FIGS. 6B and 6C illustrate a brake torque 198 of the observer wheel 24A and the wheel speed 80 of the observer wheel 24A, respectively, during the skid condition 190. FIG. 6D illustrates an exemplary mu-slip curve 230 as the designed observer wheel 24A undergoes the skid condition 190. The graphs shown in FIGS. 6A-6D each include four operating points, which are labeled as operating point 1, operating point 2, operating point 3, and operating point 4. As seen in FIG. 6A, the brake pressure 196 of the observer wheel 24A increases between operating point 1, operating point 2, and operating point 3. As seen in FIG. 6C, the observer wheel 24A starts to undergo the skid condition 190 between operating point 3 and operating point 4. However, the observer wheel 24A recovers from the skid condition 190 after operating point 4.

Referring to FIGS. 1, 5, 6A, and 6C, the control module 22 increases the value of the first brake pressure command 188, which results in an increased brake pressure 196 of the observer wheel 24A (FIG. 6A). The control module 22 continues to increase the value of the first brake pressure command 188 until the skid condition 190 is detected (between operating point 3 and operating point 4). An increase in the first brake pressure command 188 results in an increased amount of brake torque (seen in FIG. 6B) and a decrease in the wheel speed 80 of the observer wheel 24A (seen in FIG. 6C).

Referring to FIGS. 1, 5, 6A, and 6C, the control module 22 determines the start of the skid condition 190 based on the difference between the wheel speed 80 of the observer wheel 24A and the actual speed 102 of the vehicle 10 (i.e., ground speed of an aircraft). Specifically, the control module 22 determines a difference in speed between the wheel speed 80 of the observer wheel 24A and the actual speed 102 of the vehicle 10 (i.e., the ground speed of an aircraft). In response to determining the difference in speed between the wheel speed 80 of the observer wheel 24A and the actual speed 102 of the vehicle 10 exceeds a threshold difference, the control module 22 determines the designed observer wheel 24A has started to undergo the skid condition 190. The threshold difference in speed represents a condition as the observer wheel 24A slips relative to a ground surface and undergoes a sudden decrease in speed. FIG. 6C illustrates the sudden decrease in the wheel speed 80 of the observer wheel 24A during the skid condition 190. Specifically, FIG. 6C illustrates a line 300 connecting operating point 3 and operating point 4 together and represents a sudden decrease in wheel speed 80 during the skid condition 190. A line 304 connects operating points 1, 2, and 3 together, and represents the wheel speed 80 as the vehicle 10 comes to a stop before the skid condition 190. The gradient of the line 300, which occurs as the observer wheel 24A is slipping during the skid condition 190, is at least twice the gradient of the line 304.

In response to detecting the start of the skid condition 190, the control module 22 decreases the value of the first brake pressure command 188. Referring to FIGS. 5 and 6C, the control module 22 continues to decrease the first brake pressure command 188 until the observer wheel 24A recovers from the skid condition 190. As seen in FIG. 6C, when the observer wheel 24A recovers from the skid condition 190, the wheel speed 80 of the observer wheel 24A is about equal to the actual speed 102 and is referred to as a skid recovery condition 240. It is to be appreciated that while only one skid condition 190 is shown in FIG. 6C, the observer wheel 24A undergoes multiple skid conditions as the aircraft 182 comes to a stop. However, only a single skid condition 190 is illustrated in the graphs shown in FIGS. 6A-6C for purposes of simplicity.

Referring to FIG. 6D, the operating points 1, 2, 3, and 4 on the mu-slip curve 230 correspond to operating points 1, 2, 3, and 4 in FIGS. 6A-6C. As mentioned above, the specific mu-slip curve 230 is based on empirical data and is dependent upon the specific type of tire 94 used by the designed observer wheel 24A (FIG. 5). It is to be appreciated that the observer wheel 24A generates the ideal slip value as the observer wheel 24A undergoes the skid condition. Specifically, with reference to FIGS. 3, 5, 6C, and 6D, at operating point 4 on the mu-slip curve 230 (shown in FIG. 6D), the effective value of the mu-slip coefficient μ is at its ideal slip point 134. In other words, the mu-slip coefficient μ is at the ideal slip point 134 when the observer wheel 24A undergoes the skid condition 190. Referring specifically to FIGS. 3, 6C, and 6D, when the wheel speed 80 of the observer wheel 24A is at a minimum value (at operating point 4), the effective value of the mu-slip coefficient μ is the ideal slip point 134.

Referring to FIGS. 5 and 6A-6D, in response to determining the observer wheel 24A is starting the skid condition 190, the control module 22 determines a second brake pressure command 189 applied to the remaining wheels 24. For example, in the embodiment as shown in FIG. 5, the second brake pressure command 189 would be applied to the remaining three wheels 24. The control module 22 determines the second brake pressure command 189 based on the target slip value 116, where the target slip value 116 is offset from the ideal slip value and results in a reduced braking efficiency of the brake system 18. Specifically, as explained above and shown in FIG. 3, the target slip point 136 is offset from the ideal slip point 134, and results in the reduced braking efficiency 140. The second brake pressure command 189 is them applied to the remaining plurality of wheels 24.

Referring to FIG. 5, in one embodiment the control module 22 determines a reduced second brake pressure command 270 by reducing the second brake pressure command 189 by a parametric confidence value. The parametric confidence value represents one or more varying operating conditions between each wheel 24 of the set of wheels 180. In an embodiment, the varying operating conditions include a coefficient of friction along a ground surface, an amount of brake wear, an amount of tire wear, vehicle speed during operation of the brake system 18, and brake torque gain. For example, one of the wheels 24 may experience a different coefficient of friction when compared to the remaining wheels 24. Specifically, one of the wheels 24 may roll along a slippery or icy patch located along the runway while the other remaining wheels 24 roll along a dry portion of the runway. In one non-limiting embodiment, the parametric confidence value reduces the second brake pressure command 189 by about ten percent, however, this value is exemplary in nature.

Figure 7:
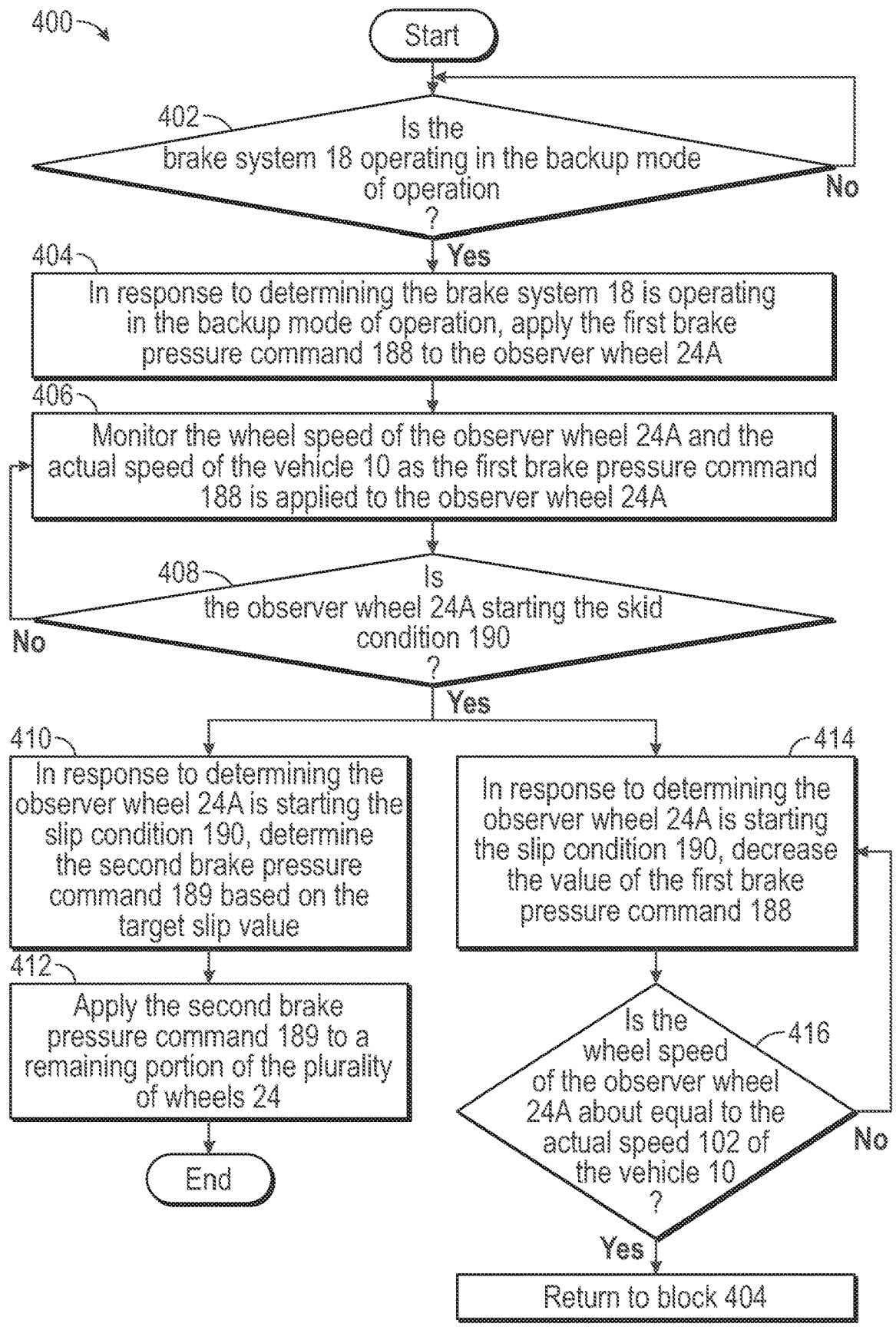
FIG. 7 is a process flow diagram illustrating another method for determining the brake pressure, according to an exemplary embodiment.

FIG. 7 is an exemplary process flow diagram illustrating a method 400 for determining the second brake pressure command 189 that is applied to the remaining wheels 24 of the aircraft 182 shown in FIG. 5. Referring generally to FIGS. 1, 5, 6A-6D, and 7, the method 400 begins at decision block 402. In decision block 402, the control module 22 determines if the brake system 18 is operating in the backup mode of operation. If the brake system 18 is operating in the backup mode of operation, then the method 400 may then proceed to block 404.

In block 204, in response to determining the brake system 18 is operating in the backup mode of operation, the first brake pressure command 188 is applied to the observer wheel 24A (seen in FIG. 5). The method 400 may then proceed to block 406.

In block 406, the control module 22 monitors the wheel speed 80 of the observer wheel and the actual speed 102 of the vehicle 182 as the first brake pressure command 188 is applied to the observer wheel 24A. If the vehicle 10 is an aircraft, such as the aircraft 182 seen in FIG. 5, then the actual speed 102 is the ground speed. Referring to FIGS. 5 and 6A, the control module 22 continues to increase a value of the first brake pressure command 188 while monitoring the wheel speed 80 of the observer wheel 24A and the actual speed 102 of the vehicle 10. The method 400 may then proceed to decision block 408.

In decision block 408, the control module 22 determines if the observer wheel 24A is starting the skid condition 190 (seen in FIG. 6C) based on the wheel speed 80 of the observer wheel 24A and the actual speed 102 of the vehicle 10. As seen in FIGS. 6C and 6D, the observer wheel 24A generates the ideal slip value (i.e., the ideal slip point 134) during the skid condition 190. For example, as explained above, the control module 22 determines the designed observer wheel 24A has started to undergo the skid condition 190 in response to determining the difference between the wheel speed 80 of the observer wheel 24A and the actual speed 102 exceeds the threshold difference.

If the observer wheel 24A is not starting the skid condition 190, then the method 400 returns to block 406. However, if the control module 22 determines the observer wheel 24A is starting the skid condition based on the wheel speed 80 of the observer wheel 24A and the actual speed 102 of the vehicle 10, then the method 400 may proceed to blocks 410 and 414 simultaneously.

In block 410, in response to determining the observer wheel 24A is starting the skid condition 190, the control module 22 determines the second brake pressure command 189 based on the target slip value, where the target slip value is offset from the ideal slip value and results in a reduced braking efficiency of the brake system 18. The method 400 may then proceed to block 412.

In block 412, the control module 22 applies the second brake pressure command 189 to the remaining portion of the plurality of wheels 24. For example, as seen in FIG. 5, the second brake pressure command 189 is applied to the remaining three wheels 24.

Blocks 414 and 416 are now described. In block 414, in response to determining the observer wheel 24A is starting the skid condition 190, the control module 22 decreases the value of the first brake pressure command 188. The method 400 may then proceed to decision block 416.

In decision block 416, the control module 22 determines if the wheel speed 80 of the observer wheel 24A is about equal to the actual speed 102 of the vehicle 10. If the wheel speed 80 is not about equal to the actual speed 102, then the method returns to block 414, and the first brake pressure command 188 continues to decrease. However, if the wheel speed 80 of the observer wheel 24A is about the same as the actual speed 102 of the vehicle 10, then the skid recovery condition 240 (seen in FIG. 6C) is achieved. The method may then return to block 404, where another skid condition 190 is re-created. Alternatively, if the vehicle 10 has come to a stop, then the method 400 may terminate.

Referring generally to FIGS. 1-7, the present disclosure provides various technical effects and benefits for an energy storage device of a brake system. Specifically, the disclosed brake system utilizes less energy each time brakes are applied during the backup mode of operation when compared to a conventional brake system, which conserves the energy stored within the energy storage device. Accordingly, in some approaches, the disclosed energy storage device may be smaller and lighter when compared to conventional devices, which in turn reduces the mass of a vehicle such as an aircraft.

Figure 8:
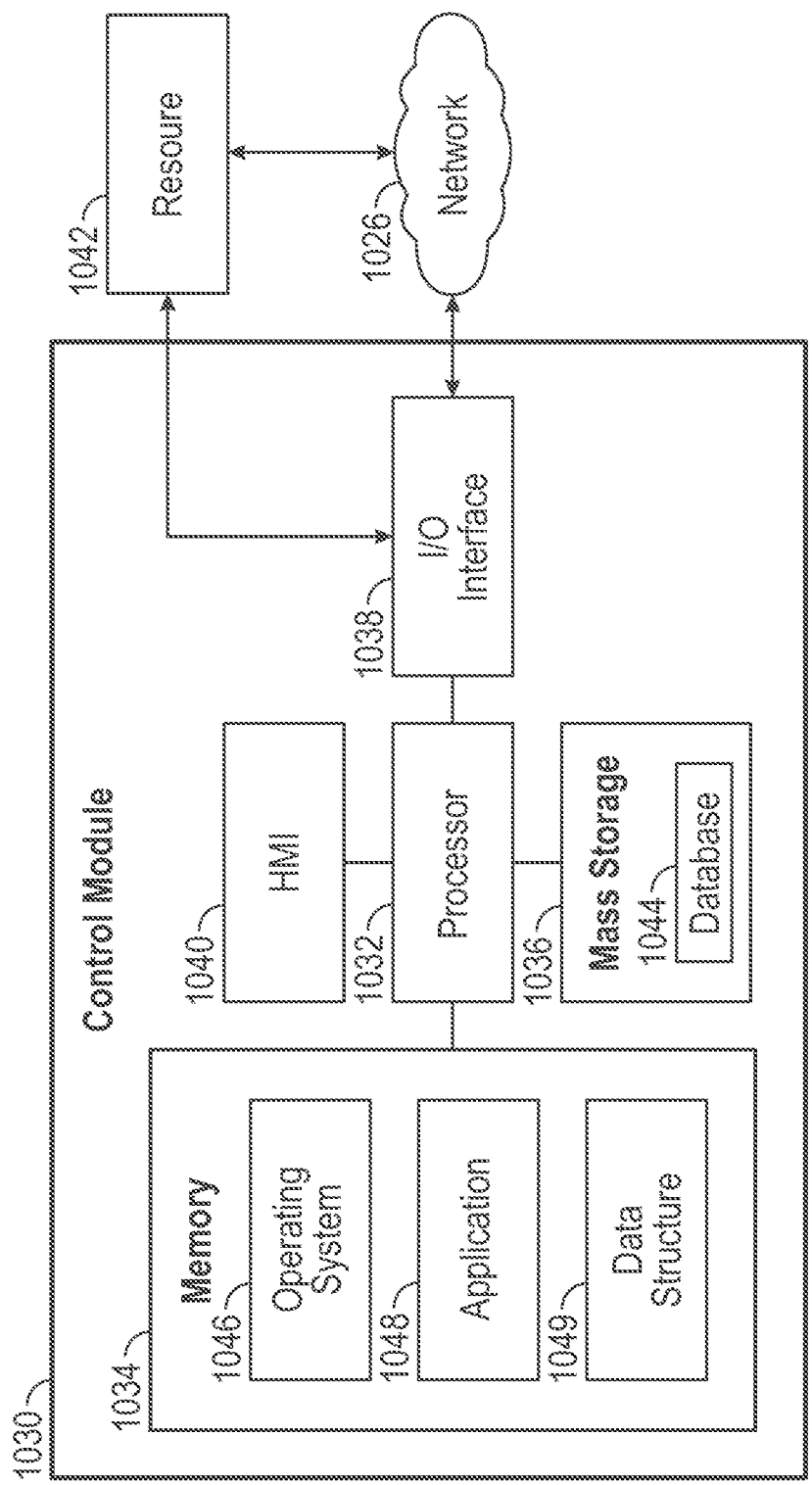
FIG. 8 is an illustration of a computer system used by the brake system of FIG. 1 according to an exemplary embodiment.

Referring now to FIG. 8, the control module 22 is implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A brake system for a vehicle, wherein the brake system includes an energy storage device configured to store and discharge energy and a plurality of wheels, the brake system comprising:
   one or more processors operatively coupled to the energy storage device and in electrical communication with the plurality of wheels; and
   a memory coupled to the one or more processors, the memory storing data comprising a database and program code that, when executed by the one or more processors, causes the brake system to:
   determine the brake system is operating in a backup mode of operation;
   in response to determining the brake system is operating in the backup mode of operation, calculate a dynamic slip of the plurality of wheels;
   determine a slip error by comparing the dynamic slip with a target slip value of the plurality of wheels, wherein the target slip value is offset from an ideal slip value of the plurality of wheels, results in a reduced braking efficiency of the brake system, is a fixed value based on a type of tire installed on the plurality of wheels, and is saved in the memory of the one or more processors;
   select the target slip value resulting in the brake system having the vehicle come to a stop within a threshold time and a threshold distance; and
   calculate an antiskid command based on the slip error, wherein the antiskid command reduces an amount of brake pressure applied to the plurality of wheels.

2. The brake system of claim 1, wherein the one or more processors execute instructions to:
   determine the slip error based on a wheel frequency of the plurality of wheels and an actual speed of the vehicle.

3. The brake system of claim 2, wherein the one or more processors execute instructions to determine the slip error based on:

$$\text{Dynamic slip} = \frac{(\text{actual speed signal} - R * \omega)}{\text{actual speed signal}}$$

wherein R represents a tire rolling radius of the plurality of wheels of the vehicle and ω represents the wheel frequency of the plurality of wheels.

4. The brake system of claim 1, wherein the one or more processors execute instructions to:
   determine a proportional value by combining the slip error with a proportional gain, wherein combining the proportional gain with the slip error results in a proportional increase in a value of the antiskid command as the slip error remains constant.

5. The brake system of claim 4, wherein the one or more processors execute instructions to:
   determine a first integral value by combing the slip error with an integral gain value; and
   integrate the first integral value, which results in a second integral value.

6. The brake system of claim 5, wherein the one or more processors execute instructions to:
   determine the antiskid command by combining the proportional value with the second integral value.

7. The brake system of claim 1, wherein the one or more processors execute instructions to:
   determine a brake pressure command based on a difference between the antiskid command and an input command, wherein the input command represents an amount of braking requested by the brake system.

8. The brake system of claim 1, wherein the energy storage device is an accumulator, a battery, a capacitor, or a flywheel.

9. The brake system of claim 1, wherein the type of tire depends on characteristics including belt construction and sidewall construction, and wherein the belt construction refers to either a radial or cross-ply construction.

10. An aircraft, comprising:
    a brake system including a plurality of wheels and an accumulator, wherein the accumulator is configured to store and discharge fluid energy as a pressurized hydraulic brake fluid;
    one or more processors operatively coupled to the accumulator and in electrical communication with the plurality of wheels; and
    a memory coupled to the one or more processors, the memory storing data comprising a database and program code that, when executed by the one or more processors, causes the brake system to:
       determine the brake system is operating in a backup mode of operation, wherein the backup mode of operation conserves the fluid energy stored in the accumulator;
       in response to determining the brake system is operating in the backup mode of operation, calculate a dynamic slip of the plurality of wheels;
       determine a slip error by comparing the dynamic slip with a target slip value of the plurality of wheels, wherein the target slip value is offset from an ideal slip value of the plurality of wheels, results in a reduced braking efficiency of the brake system, is a fixed value based on a type of tire installed on the plurality of wheels, and is saved in the memory of the one or more processors;
       select the target slip value resulting in the brake system having the aircraft come to a stop within a threshold time and a threshold distance; and
       calculate an antiskid command based on the slip error, wherein the antiskid command reduces an amount of brake pressure applied to the plurality of wheels.

11. The aircraft of claim 10, wherein the one or more processors execute instructions to:
    determine the slip error based on a wheel frequency of the plurality of wheels and an actual speed of the aircraft.

12. The aircraft of claim 11, wherein the one or more processors execute instructions to determine the slip error based on:

$$\text{Dynamic slip} = \frac{(\text{actual speed signal} - R*\omega)}{\text{actual speed signal}}$$

wherein R represents a tire rolling radius of the plurality of wheels of the aircraft and $\omega$ represents the wheel frequency of the plurality of wheels.

13. The aircraft of claim 10, wherein the one or more processors execute instructions to:
    determine a proportional value by combining the slip error with a proportional gain, wherein combining the proportional gain with the slip error results in a proportional increase in a value of the antiskid command as the slip error remains constant.

14. The aircraft of claim 13, wherein the one or more processors execute instructions to:
    determine a first integral value by combing the slip error with an integral gain value; and
    integrate the first integral value, which results in a second integral value.

15. The aircraft of claim 14, wherein the one or more processors execute instructions to:
    determine the antiskid command by combining the proportional value with the second integral value.

16. The aircraft of claim 10, wherein the one or more processors execute instructions to:
    determine a brake pressure command based on a difference between the antiskid command and an input command, wherein the input command represents an amount of braking requested by the brake system.

17. A method of determining an antiskid command during a backup mode of operation for a brake system of a vehicle, wherein the brake system includes a plurality of wheels and energy storage device configured to store and discharge energy, the method comprising:
    determining, by a computer, the brake system is operating in a backup mode of operation;
    in response to determining the brake system is operating in the backup mode of operation, calculating, by the computer, a dynamic slip of the plurality of wheels;
    determining a slip error by comparing the dynamic slip with a target slip value, wherein the target slip value is less than an ideal slip value results in a reduction in braking efficiency when compared to the ideal slip value, is a fixed value based on a type of tire installed on the plurality of wheels, and is saved in a memory of the computer;
    selecting the target slip value resulting in the brake system having the vehicle come to a stop within a threshold time and a threshold distance; and
    calculating an antiskid command based on the slip error, wherein the antiskid command reduces an amount of brake pressure applied to the plurality of wheels.

18. The method of claim 17, further comprising:
    determining the slip error based on a wheel frequency of the plurality of wheels and an actual speed of the vehicle.

19. The method of claim 18, further comprising determining the dynamic slip based on:

$$\text{Dynamic slip} = \frac{(\text{actual speed of the vehicle} - R*\omega)}{\text{actual speed signal}}$$

wherein R represents a tire rolling radius of the plurality of wheels of the vehicle and ω represents the wheel frequency of the plurality of wheels.

20. The method of claim 17, further comprising:

determining a brake pressure command based on a difference between the antiskid command and an input command, wherein the input command represents an amount of braking requested by the brake system.

\* \* \* \* \*

UNITED STATES PATENT AND TRADEMARK OFFICE
CERTIFICATE OF CORRECTION

| | |
|---|---|
| PATENT NO. | : 11,273,909 B2 |
| APPLICATION NO. | : 16/451858 |
| DATED | : March 15, 2022 |
| INVENTOR(S) | : Nima Forghani, David T. Yamamoto and Steven Elliot Smith |

It is certified that error appears in the above-identified patent and that said Letters Patent is hereby corrected as shown below:

In the Claims

In Column 16, Lines 1-4, Claim 12 reads:
" $\text{Dynamic slip} = \frac{(\text{actual speed signal} - R * \omega)}{\text{actual speed signal}}$ "

Should read:
-- $\text{Dynamic slip} = \frac{(\text{actual speed of the vehicle} - R * \omega)}{\text{actual speed signal}}$ --

In Column 16, Line 45, Claim 17 reads:
"less than an ideal slip value results in a reduction"
Should read:
--less than an ideal slip value, results in a reduction--

Signed and Sealed this
Twenty-seventh Day of December, 2022

Katherine Kelly Vidal
*Director of the United States Patent and Trademark Office*